US 6,613,712 B1

(12) United States Patent
McDaniel et al.

(10) Patent No.: US 6,613,712 B1
(45) Date of Patent: *Sep. 2, 2003

(54) ORGANOMETAL CATALYST COMPOSITIONS WITH SOLID OXIDE SUPPORTS TREATED WITH FLUORINE AND BORON

(75) Inventors: Max P. McDaniel, Bartlesville, OK (US); Kathy S. Collins, Bartlesville, OK (US); Elizabeth A. Benham, Bartlesville, OK (US); Anthony P. Eaton, Dewey, OK (US); Michael D. Jensen, Bartlesville, OK (US); Joel L. Martin, Bartlesville, OK (US); Gil R. Hawley, Dewey, OK (US)

(73) Assignee: Phillips Petroleum Company, Bartlesville, OK (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/448,631

(22) Filed: Nov. 24, 1999

(51) Int. Cl.$^7$ ............... B01J 31/00; B01J 37/00; C08F 4/02; C08F 4/60; C08F 4/44

(52) U.S. Cl. ............... 502/104; 502/103; 502/107; 502/119; 526/127; 526/130; 526/133; 526/135; 526/943

(58) Field of Search ............... 502/104, 107, 502/103, 119; 526/127, 130, 133, 135

(56) References Cited

U.S. PATENT DOCUMENTS

| | | | | |
|---|---|---|---|---|
| 2,922,782 A | * | 1/1960 | Hay | 502/119 |
| 3,781,220 A | * | 12/1973 | Shilov et al. | 502/119 |
| 4,359,403 A | * | 11/1982 | Hoff et al. | 502/104 |
| 4,522,988 A | * | 6/1985 | Kang et al. | 502/119 |
| 4,522,989 A | * | 6/1985 | Kang | 502/119 |
| 4,562,171 A | * | 12/1985 | Kang | 502/119 |
| 4,562,172 A | * | 12/1985 | Kang et al. | 502/119 |
| 5,037,911 A | * | 8/1991 | McDaniel et al. | 526/130 |
| 5,064,796 A | * | 11/1991 | Speca | 502/119 |
| 5,171,798 A | * | 12/1992 | McDaniel et al. | 502/117 |
| 5,276,119 A | | 1/1994 | Kelsey | 526/170 |
| 5,352,658 A | * | 10/1994 | Evertz et al. | 502/107 |
| 5,369,195 A | * | 11/1994 | Kelsey | 526/199 |
| 5,543,376 A | * | 8/1996 | Bergmeister | 502/117 |
| 5,594,079 A | * | 1/1997 | Hara et al. | 502/119 |
| 6,177,526 B1 | * | 1/2001 | Fritze | 502/104 |
| 6,245,869 B1 | * | 6/2001 | Debras et al. | 502/117 |
| 6,300,271 B1 | * | 10/2001 | McDaniel et al. | 502/104 |
| 6,355,594 B1 | * | 3/2002 | McDaniel et al. | 502/104 |
| 6,368,999 B1 | * | 4/2002 | Speca | 526/133 |
| 6,395,666 B1 | * | 5/2002 | McDaniel et al. | 502/104 |

FOREIGN PATENT DOCUMENTS

EP 0 628 574 A1 * 12/1994

OTHER PUBLICATIONS

US 2001/0051586 A1, U.S. Pre–Grant publication to Job, Dec. 2001, class 502/103.*
US 2001/0051698 A1, U.S. Pre–Grant publication to Speca, Dec. 2001, class 502/104.*
US 2002/0007023 A1, U.S. Pre–Grant publication to McDaniel et al., Jan. 2002, class 502/104.*
US 2002/0082365 A1, U.S. Pre–Grant publication to McDaniel et al., Jun. 2002, class 526/127.*

* cited by examiner

*Primary Examiner*—Elizabeth D. Wood
*Assistant Examiner*—J. Pasterczyk
(74) *Attorney, Agent, or Firm*—Kilpatrick Stockton LLP

(57) ABSTRACT

The invention provides for compositions that are useful for polymerizing at least one monomer to produce a polymer, wherein the composition comprises a post-contacted organometal compound, a post-contacted organoaluminum compound, and a post-contacted solid oxide compound treated with boron and fluoride.

17 Claims, No Drawings

ORGANOMETAL CATALYST COMPOSITIONS WITH SOLID OXIDE SUPPORTS TREATED WITH FLUORINE AND BORON

FIELD OF THE INVENTION

This invention is related to the field of organometal catalyst compositions.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1958. However, their low productivity did not allow them to be commercialized. About 1975, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Fluoro-organo borate compounds have been used in place of large amounts of methyl aluminoxane. However, this is not satisfactory, since such borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniformed particles are desirable because they improve the efficiency of polymer production and transportation. Efforts have been made to produce heterogeneous metallocene catalysts; however, these catalysts have not been entirely satisfactory.

Therefore, the inventors provide this invention to help solve these problems.

SUMMARY OF THE INVENTION

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the composition under polymerization conditions to produce the polymer.

Another object of this invention is to provide an article that comprises the polymer produced with the catalyst composition of this invention.

In accordance with one embodiment of this invention, a process to produce a catalyst composition is provided. The process comprises (or optionally, "consists essentially of", or "consists of") contacting an organometal compound, an organoaluminum compound, and a treated solid oxide compound to produce the catalyst composition, wherein the organometal compound has the following general formula:

$$(X^1)(X^2)(X^3)(X^4)M^1$$

wherein $M^1$ is selected from the group consisting of titanium, zirconium, and hafnium;

wherein $(X^1)$ is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on $(X^2)$ are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, and hydrogen;

wherein at least one substituent on $(X^2)$ can be a bridging group which connects $(X^1)$ and $(X^2)$;

wherein the organoaluminum compound has the following general formula:

$$Al(X^5)_n(X^6)_{3-n}$$

wherein $(X^5)$ is a hydrocarbyl having from 1 to about 20 carbon atoms;

wherein $(X^6)$ is a halide, hydride, or alkoxide; and wherein "n" is a number from 1 to 3 inclusive;

wherein the treated solid oxide compound comprises fluorine, boron, and a solid oxide compound;

wherein the solid oxide compound comprises silica, and there is a substantial absence of aluminum, titanium, or zirconium.

In accordance with another embodiment of this invention, a process is provided comprising contacting at least one monomer and the catalyst composition under polymerization condition to produce a polymer.

In accordance with another embodiment of this invention, an article is provided. The article comprises the polymer produced in accordance with this invention.

These objects, and other objects, will become more apparent to those with ordinary skill in the art after reading this disclosure.

DETAILED DESCRIPTION OF THE INVENTION

Organometal compounds used in this invention have the following general formula:

$$(X^1)(X^2)(X^3)(X^4)M^1$$

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

bis(cyclopentadienyl)hafnium dichloride;

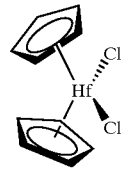

bis(cyclopentadienyl)zirconium dichloride;

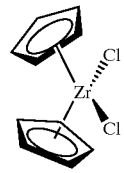

1,2-ethanediylbis($\eta^5$-1-indenyl)di-n-butoxyhafnium;

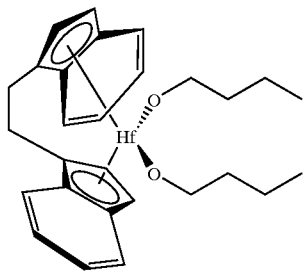

1,2-ethanediylbis($\eta^5$-1-indenyl)dimethylzirconium;

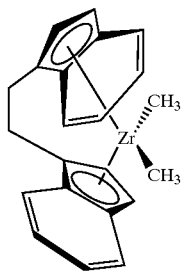

3,3-pentanediylbis($\eta^5$-4,5,6,7-tetrahydro-1-indenyl) hafnium dichloride;

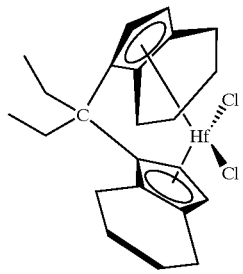

methylphenylsilylbis($\eta^5$-4,5,6,7-tetrahydro-1-indenyl) zirconium dichloride;

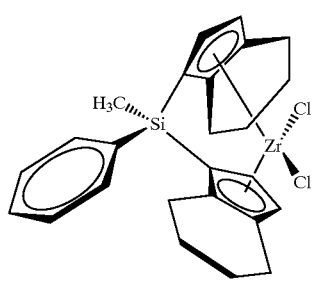

bis(n-butylcyclopentadienyl)bis(di-t-butylamido) hafnium;

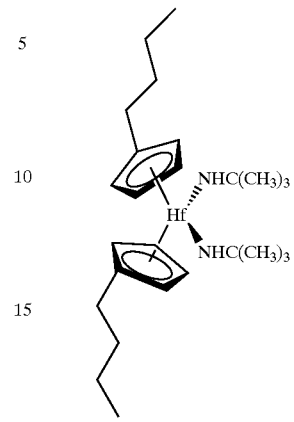

bis(n-butylcyclopentadienyl)zirconium dichloride;

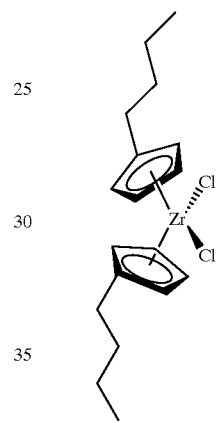

dimethylsilylbis(1-indenyl)zirconium dichloride;

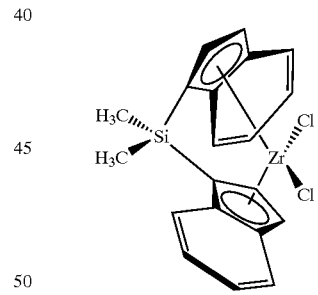

octylphenylsilylbis(1-indenyl)hafnium dichloride;

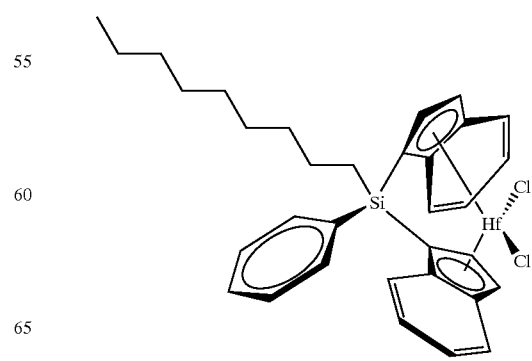

dimethylsilylbis($\eta^5$-4,5,6,7-tetrahydro-1-indenyl) zirconium dichloride;

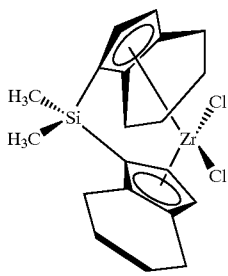

dimethylsilylbis(2-methyl-1-indenyl)zirconium dichloride;

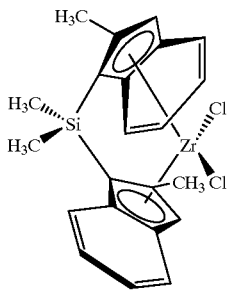

1,2-ethanediylbis(9-fluorenyl)zirconium dichloride;

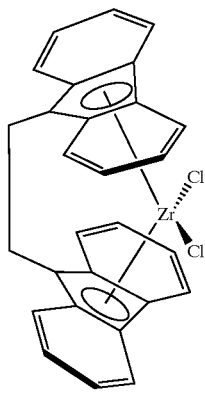

indenyl diethoxy titanium(IV)chloride;

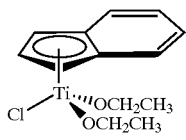

(isopropylamidodimethylsilyl)cyclopentadienyltitanium dichloride;

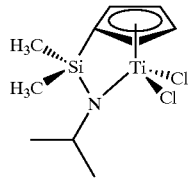

bis(pentamethylcyclopentadienyl)zirconium dichloride;

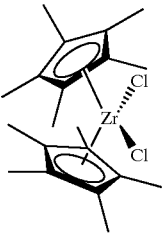

bis(indenyl)zirconium dichloride;

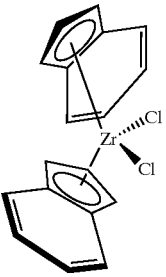

methyloctylsilyl bis(9-fluorenyl)zirconium dichloride;

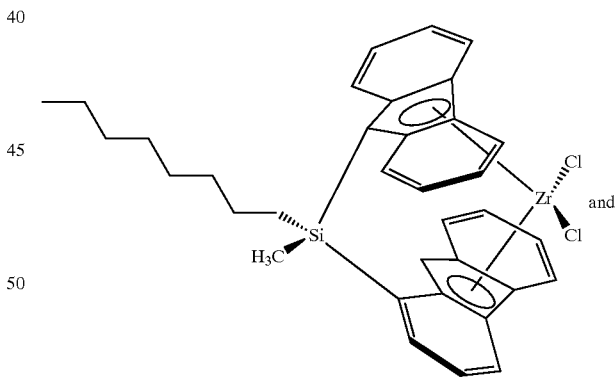 and bis-[1-(N,N-diisopropylamino)boratabenzene] hydridozirconium trifluoromethylsulfonate

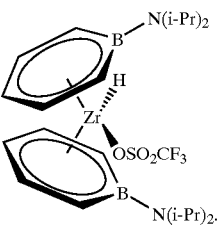

Preferably, the organometal compound is selected from the group consisting of bis(n-butylcyclopentadienyl)zirconium dichloride;

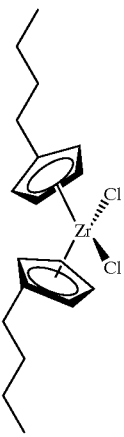

bis(indenyl)zirconium dichloride;

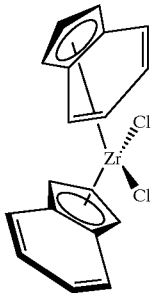

dimethylsilylbis(1-indenyl)zirconium dichloride;

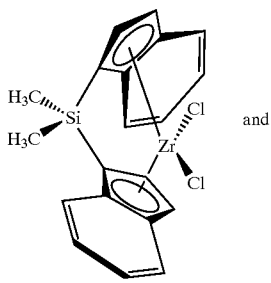

and methyloctylsilylbis(9-fluorenyl)zirconium dichloride

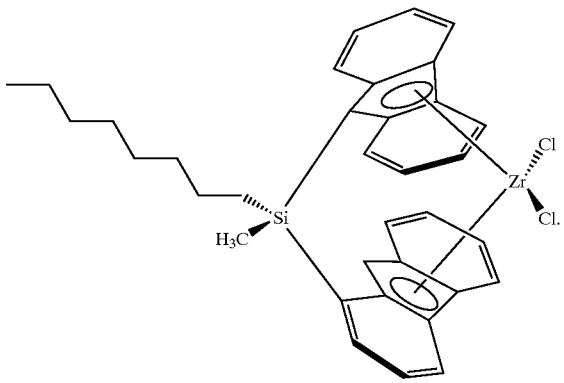

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:
trimethylaluminum;
triethylaluminum (TEA),
diethylaluminum ethoxide;
tributylaluminum;
diisobutylaluminum hydride;
triisobutylaluminum hydride;
triisobutylaluminum; and
diethylaluminum chloride.

Currently, TEA is preferred.

The treated solid oxide compound comprises fluorine, boron, and a solid oxide compound. The solid oxide compound comprises silica, and there is a substantial absence of titanium and zirconium.

Suitable preformed silicas include those made by aqueous gellation and sold commercially by W.R. Grace Company, such as Davison grade 952, and grade 951, or flame hydrolyzed silicas such as those sold under the name of Cabosils. Suitable silicas also include those made by aqueous gellation and subsequent drying from organic solvents, such as exemplified by U.S. Pat. No. 3,900,457, herein incorporated by reference. Suitable silicas may also be made by hydrolysis of ethyl tetraorthosilicate provided that a gel thus formed is comprised of substantially silica or silica-boria, as exemplified in U.S. Pat. Nos. 4,301,034, 4,547,557, and 4,339,559; the entire disclosures of which are herein incorporated by reference.

To prepare the treated solid oxide compound, fluorine and boron can be added to the solid oxide compound by any method known in the art. In addition, the fluorine and boron can be added to the solid oxide compound in any order of steps that can produce the treated solid oxide compound.

A boron-containing solid oxide compound can be made by aqueous or anhydrous cogellation of a silicate compound and a boron-containing compound, or a preformed silica can be impregnated or otherwise treated with a boron-containing compound, such as, for example, boric acid, organic borate esters, boranes, alkyl boranes, and mixtures thereof A particularly useful variation is to impregnate a preformed silica with ammonium tetrafluoroborate ($NH_4BF_4$) or fluoroboric acid ($HBF_4$).

In a first method, the boron-containing solid oxide compound can be made by any suitable method of cogelling boron from a boron-containing compound and a silicate compound. The boron can be added to the solid oxide compound by cogellation of aqueous materials, as disclosed in U.S. Pat. Nos. 3,887,494; 3,119,569; 4,405,501; 4,436,882; 4,436,883; 4,392,990; 4,081,407; 4,981,831; and 4,152,503; the entire disclosures of which are hereby incorporated by reference. For example, ethyl tetraorthosilicate can be reacted and hydrolyzed in the presence of boric acid, a borate compound, or an organoboron compound to produce the boron-containing solid oxide compound.

Alternatively, boron-containing compounds, such as boric acid or sodium borates, can be incorporated into silicate gels formed from an aqueous water glass solution to produce the boron-containing solid oxide compound.

In a second method, boron can be added to the solid oxide compound by cogellation in an organic or anhydrous solution as disclosed in U.S. Pat. Nos. 4,301,034; 4,547,557; and 4,339,559; the entire disclosures of which are hereby incorporated by reference.

In a third method, silicon and boron compounds can be combined by flame hydrolysis.

The preferred method is to impregnate a preformed solid oxide compound before or after calcining with an aqueous or organic solution of a boron-containing compound to produce the boron-containing solid oxide compound. A suitable amount of the solution is utilized to provide the desired concentration of boron after drying. The boron-containing solid oxide compound is then dried by any suitable method known in the art. For example, the drying can be accomplished by vacuum drying, spray drying, or flash drying.

These boron-containing solid oxide compounds produced by cogellation contain from about 0.5 to about 50% by weight boron based on the weight of the boron-containing solid oxide compound before calcining, preferably from about 1 to about 20 weight percent boron, and most preferably from 2 to 10 weight percent boron. The boron-containing solid oxide compounds can also contain minor amounts of other components, provided that the do not interfere with their use as an activator for the organometal compounds. Other minor components include, but are not limited to, iron, calcium, chromium, vanadium, zinc, nickel, phosphate, magnesium, and the like.

The solid oxide compound should have a pore volume greater than about 0.5 cc/g, preferably greater than about 0.8 cc/g, and most preferably, greater than 1.0 cc/g.

The solid oxide compound should have a surface area after calcining at 500° C. in a range of about 100 to about 1000 m$^2$/g, preferably from about 200 to about 800 m$^2$/g, and most preferably, from 250 to 600 m$^2$/g.

Any boron-containing compound known in the art that can impregnate the solid oxide compound with boron can be used in this invention. The boron-containing compound can include, but is not limited to, boric acid ($H_3BO_3$), sodium borate ($Na_3BO_3$), boron propoxide ($B(OC_3H_7)_3$), triethylborane ($B(C_2H_5)_3$), boroxines, boron hydrides, and mixtures thereof.

When impregnating a preformed silica with a boron-containing compound, generally, the amount of boron present is in a range of about 0.1 to about 10 millimoles per gram of boron-containing solid oxide compound before calcining or the amount added to a precalcined solid oxide compound. Preferably, the amount of boron present in the boron-containing solid oxide compound is in a range of about 0.5 to about 5 millimoles per gram of boron-containing solid oxide compound before calcining or the amount added to a precalcined solid oxide compound. Most preferably, the amount of boron present is in a range of 1 to 3 millimoles per gram of boron-containing solid oxide compound before calcining or the amount added to a precalcined solid oxide compound.

In at least one step in the production of the treated solid oxide compound, calcining occurs. Generally, calcining is conducted for about 1 minute to about 100 hours, preferably for about I hour to about 50 hours, and most preferably, from 3 hours to 20 hours. The calcining is conducted at a temperature in a range of about 150 to about 900° C., preferably, in a range of about 200 to about 700° C., and most preferably, in a range of 250 to 500° C. Any type of suitable atmosphere can be used during calcining. Generally, calcining can be completed in an inert atmosphere. Alternatively, an oxidizing atmosphere, such as, for example, oxygen or air, or a reducing atmosphere, such as, for example, hydrogen or carbon monoxide, can be used.

To produce the treated solid oxide compound, before, during, or after calcining, the solid oxide compound is contacted with a fluorine-containing compound. Any method known in the art for contacting the solid oxide compound with the fluorine-containing compound can be used in this invention. One common method is to impregnate the solid oxide compound with an aqueous solution of a fluorine-containing salt, such as, for example, ammonium fluoride ($NH_4F$), ammonium bifluoride ($NH_4HF_2$), hydrofluoric acid (HF), ammonium silicofluoride (($NH_4)_2SiF_6$), ammonium fluoroborate ($NH_4BF_4$), ammonium fluorophosphate ($NH_4PF_6$), fluoroboric acid ($HBF_4$), and mixtures thereof Alternatively, the fluorine-containing compound can be dissolved into an organic solvent, such as an alcohol, and used to impregnate the solid oxide compound to minimize shrinkage of pores during drying. Drying can be accomplished by any method known in the art such as vacuum drying, spray drying, flash drying, and the like.

The fluorine-containing compound can also be incorporated into a gel by adding it to one of the aqueous materials before gellation. These aqueous materials were disclosed in the first and second methods for preparing boron-containing solid oxide compounds discussed previously in this disclosure.

The fluorine-containing compound can also be added to a slurry containing a gel before drying. Formation of a gel was disclosed in the first and second methods for preparing boron-containing solid oxide compounds discussed previously in this disclosure.

The fluorine-containing compound can also be added during calcining. In this technique, the fluoride-containing compound can be vaporized into a gas stream used to fluidize the solid oxide compound or boron-containing solid oxide compound so that it is fluorided from the gas stream. In addition to some of the fluorine-containing compounds described above, volatile organic fluorides may be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and mixtures thereof can be vaporized and contacted with the solid oxide compound or boron-containing solid oxide compound at about 300 to about 600° C. in air or nitrogen. Inorganic fluoride containing vapors may also be used, such as, for example, hydrogen fluoride or even elemental fluorine gas.

The solid oxide compound or boron-containing solid oxide compound can also be calcined at a temperature in a range of about 100 to 900° C. before being fluorided.

Another method of producing the treated solid oxide compound is to simultaneously contact a preformed solid oxide compound prior to calcining with a boron-containing compound, such as boric acid, and a fluorine-containing compound, such as hydrofluoric acid.

A preferred method of producing the treated solid oxide compound is to contact a preformed solid oxide compound before calcining and ammonium fluoroborate ($NH_4BF_4$) or fluoroboric acid ($HBF_4$), thus incorporating the fluoride and boron into or onto the preformed solid oxide compound in one treatment.

Another preferred method of producing the treated solid oxide compound is to first calcine the solid oxide compound producing a calcined solid oxide compound. Then, contacting the calcined solid oxide compound with an anhydrous solution of fluoroboric acid to produced the treated solid oxide compound. Optionally, the treated solid oxide compound can be further calcined as discussed previously in this disclosure.

The amount of fluorine present in the treated solid oxide compound is about 1 to about 50% by weight fluorine based on the weight of the treated solid oxide compound before calcining or the amount added to a precalcined solid oxide compound. Preferably, it is about 3 to about 25% by weight, and most preferably, it is 4 to 25% by weight fluorine based on the weight of the treated solid oxide compound before calcining or the amount added to a precalcined solid oxide compound.

The compositions of this invention can be produced by contacting the organometal compound, the treated solid oxide compound, and the organoaluminum compound, together. This contacting can occur in a variety of ways, such as, for example, blending. Furthermore, each of these compounds can be fed into the reactor separately, or various combinations of these compounds can be contacted together before being further contacted in the reactor, or all three compounds can be contacted together before being introduced into the reactor.

Currently, one method is to first contact an organometal compound and a treated solid oxide compound together, for about 1 minute to about 24 hours, preferably, about 1 minute to about 1 hour, at a temperature from about 10° C. to about 100° C., preferably 15° C. to 50° C., to form a first mixture, and then contact this first mixture with an organoaluminum compound to form the catalyst composition.

Another method is to precontact the organometal compound, the organoaluminum compound, and the treated solid oxide compound before injection into a polymerization reactor for about 1 minute to about 24 hours, preferably, 1 minute to 1 hour, at a temperature from about 10° C. to about 200° C., preferably 20° C. to 80° C. to produce the catalyst composition.

A weight ratio of the organoaluminum compound to the treated solid oxide compound in the catalyst composition ranges from about 5:1 to about 1:1000, preferably, from about 3:1 to about 1:100, and most preferably, from 1:1 to 1:50.

A weight ratio of the treated solid oxide compound to the organometal compound in the composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted treated solid oxide compound. Preferably, the post-contacted treated solid oxide compound is the majority, by weight, of the composition. Often times, specific components of a catalyst are not known, therefore, for this invention, the catalyst composition is described as comprising post-contacted compounds.

A weight ratio of the post-contacted organoaluminum compound to the post-contacted treated solid oxide compound in the catalyst composition ranges from about 5:1 to about 1:1000, preferably, from about 3:1 to about 1:100, and most preferably, from 1:1 to 1:50.

A weight ratio of the post-contacted treated solid oxide compound to the post-contacted organometal compound in the catalyst composition ranges from about 10,000:1 to about 1:1, preferably, from about 1000:1 to about 10:1, and most preferably, from 250:1 to 20:1.

The catalyst composition of this invention has an activity greater than a catalyst composition that uses the same organometal compound, and the same organoaluminum compound, but uses silica, fluorided silica, or silica-boria as an activator for the organometal compound as shown in comparative examples 2–4. The activity is measured under slurry polymerization conditions, using isobutane as the diluent, and with a polymerization temperature of about 50 to about 110° C., and an ethylene pressure of about 400 to about 800 psig. When comparing activities, the polymerization runs should occur at the same polymerization conditions. The reactor should have substantially no indication of any wall scale, coating or other forms of fouling.

However, it is preferred if the activity is greater than about 100 grams of polymer per gram of treated solid oxide compound per hour, more preferably greater than about 500, and most preferably greater than 1000. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no fluoro-organo borate compounds need to be used in order to form the catalyst composition. Examples of such fluoro-organo borate compounds that are not needed in this invention include, but are not limited to, fluorinated aryl borates, such as, N,N-dimethylanilinium tetrakis(pentafluorophenyl) borate, triphenylcarbenium tetrakis(pentafluorophenyl) borate, lithium tetrakis(pentafluorophenyl)borate, tris(pentafluorophenyl)boron, N,N-dimethylanilinium tetrakis[3,5-bis(trifluoromethyl)phenyl]borate, triphenylcarbenium tetrakis[3,5-bis(trifluoromethyl)phenyl]borate, and mixtures thereof The above examples and related fluoro-organo borate compounds are thought to form "weakly-coordinating" anions when combined with metallocene catalysts as disclosed in U.S. Pat. No. 5,919,983. The boron compounds of this invention are distinguished from those prior art fluoro-organo borate compounds described previously in that they are inorganic when the treated solid oxide compound is formed, either through the direct use of an inorganic borate or by calcining organoboron compounds to boron oxides. In summary, this means that the treated solid oxide compound, unlike the prior art fluoro-organo borate compounds described above, is inorganic and heterogenous in diluents during polymerization. They can be used for polymerizing monomers and can be easily and inexpensively produced because of the substantial absence of any aluminoxane compounds or fluoro-organo borate compounds. Additionally, no organochromium compounds or $MgCl_2$ need to be added to form the invention. Although aluminoxane, fluoro-organo borate compounds, organochromium compounds, or $MgCl_2$ are not needed in the preferred embodiments to produce the catalyst composition, these compounds can be used in other embodiments of this invention.

In another embodiment of this invention, a process comprising contacting at least one monomer and the catalyst composition to produce at least one polymer is provided.

The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugatedor nonconjugated diolefins such as 1,3-butadiene, isoprene, piperylene, 2,3-dimethyl-1,3-butadiene, 1,4-pentadiene, 1,7-hexadiene, and other such diolefins and mixtures thereof When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in a range of about 10 to about 1000 microns, preferably about 25 to about 500 microns, and most preferably, 50 to 200 microns, for best control during polymerization.

In a more specific embodiment of this invention, a process is provided to produce a catalyst composition, the process comprising (optionally, "consisting essentially of", or "consisting of"):

(1) contacting silica with an aqueous solution containing ammonium fluoroborate or fluoroboric acid to produce a fluorided, boron-containing solid oxide compound having from 1 to 3 millimoles of boron per gram of fluorided, boron-containing solid oxide compound before calcining and 4 to 25% by weight fluorine based on the weight of the boron-containing solid oxide compound before cacining;

(2) calcining the fluorided, boron-containing solid oxide compound at a temperature within a range of 250 to 500° C. for 3 to 20 hours to produce a calcined composition;

(3) combining the calcined composition and bis(n-butylcyclopentadienyl)zirconium dichloride at a temperature within a range of 15° C. to 50° C. for 1 minute to 1 hour to produce a mixture; and (4) combining the mixture and triethylaluminum to produce the catalyst composition.

Hydrogen can be used with this invention in a polymerization process to control polymer molecular weight.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Calcining

About 10 grams of an oxide compound were placed in a 1.75 inch quartz tube fitted with a sintered quartz disk at the bottom. While the oxide compound was supported on the disk, dry air was blown up through the disk at the linear rate of about 1.6 to about 1.8 standard cubic feet per hour. An electric furnace around the quartz tube was then turned on, and the temperature was raised at the rate of about 400° C. per hour to the indicated temperature, such as 600° C. At that temperature, the oxide compound was allowed to fluidize for three hours in the dry air. Afterward, the oxide compound was collected and stored under dry nitrogen, where it was protected from the atmosphere until ready for testing. It was never allowed to experience any exposure to the atmosphere.

Polymerization Runs

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

Unless otherwise stated, first, a small amount (0.01 to 0.10 grams normally) of an oxide compound or the inventive treated solid oxide compound was charged under nitrogen to the dry reactor. Next, 2.0 milliliters of a toluene solution containing 0.5 percent by weight of bis(n-butylcyclopentadienyl)zirconium dichloride were added, followed by 0.6 liters of isobutane liquid. Then, 1.0 milliliter of a 1.0 molar solution of triethylaluminum (TEA) was added, followed by another 0.6 liters of isobutane liquid. The reactor was heated up to the specified temperature, typically to 90° C. Finally, ethylene was added to the reactor to equal a fixed pressure of about 550 psig to produce a reaction mixture. The reaction mixture was allowed to stir for usually about one hour. As ethylene was consumed, more ethylene flowed in to maintain the pressure. The activity was noted by recording the flow of ethylene into the reactor to maintain the set pressure.

After the allotted time, the ethylene flow was stopped, and the reactor slowly depressurized and opened to recover a granular polymer. In all cases, the reactor was clean with no indication of any wall scale, coating or other forms of fouling. The polymer was then removed and weighed. Activity was specified as grams of polymer produced per gram of oxide compound or treated solid oxide compound charged per hour.

Description of Results

Control and inventive examples are described below. The results of these polymerization tests are listed in Tables 1 and 2.

Control Example 1 (No Oxide Compound)

A polymerization run was made in the absence of any oxide compound by the procedure discussed previously. No polymer was found in the reactor, and no ethylene consumption was detected.

Control Example 2 (Silica)

Grade 952 silica was obtained from W.R. Grace having a pore volume of about 1.6 cc/g and a surface area of about 300 m$^2$/g. A sample of the silica was calcined at 600° C. in dry air for three hours as described previously to produce a calcined silica. The calcined silica was then tested for polymerization activity with an organometal compound and TEA. The calcined silica yielded only 1 gram of polymer per gram of calcined silica per hour.

Control Example 3 (Fluorided Silica)

A 33.82 gram sample of the same grade 952 silica described in Example 2 was impregnated with 70 milliliters of an aqueous solution containing 3.45 grams of ammonium bifluoride to produce a fluorided silica. Then, the fluorided silica was dried under vacuum at 120° C. overnight. A sample of the fluorided silica was calcined in dry air at 450° C. for three hours. It was then tested for polymerization activity with TEA and an organometal compound, but it yielded no polymer.

Control Example 4 (Silica-Boria)

A 10.3 gram sample of W.R. Grace grade 952 silica was impregnated with 20 milliliters of a solution containing 0.021 moles of boric acid to produce a silica-boria. It was then dried under vacuum at 120° C. overnight, and a sample of the silica-boria was calcined in dry air at 400° C. for three hours. When tested for polymerization activity, the silica-boria produced 12 grams of polymer per gram of silica-boria per hour.

Inventive Examples 5–7 (Treated Solid Oxide Compound)

A 10.3 gram sample of W.R. Grace grade 952 silica was impregnated with 20 milliliters of an aqueous solution containing 0.021 moles of boric acid and 1.0 grams of ammonium bifluoride to produce a fluorided, boron-containing solid oxide compound. It was then dried under vacuum at 120° C. overnight, and three different samples of the fluorided, boron-containing solid oxide compound were calcined in dry air for three hours at 300° C., 400° C., and 500° C. to produce a treated solid oxide compound. When tested for polymerization activity, these samples produced 490, 305, and 161 grams of polymer per gram of treated solid oxide compound per hour respectively.

Inventive Example 8 (Treated Solid Oxide Compound)

A 12.5 gram sample of 12.5 grams of W.R. Grace grade 952 silica was impregnated with 25 milliliters of an aqueous solution containing 0.015 moles of fluoroboric acid (HBF$_4$) to produce a fluorided, boron-containing solid oxide compound. It was then dried under vacuum at 120° C. overnight, and a sample was calcined in dry air for three hours at 250° C. to produce a treated solid oxide compound. When tested for polymerization activity, the treated solid oxide compound produced 544 grams of polymer per gram of treated solid oxide compound per hour.

Inventive Example 9 (Treated Solid Oxide Compound)

Four samples of grade 952 silica support were impregnated with about two times their weight of an aqueous solution containing varying quantities of ammonium fluoroborate (NH$_4$BF$_4$) to produce fluorided, boron-containing solid oxide compounds. The exact quantities are listed in Table 2. Each sample was then dried under vacuum at 120° C. overnight. Each of these fluorided, boron-containing solid oxide compound samples was divided into smaller samples, each of which was calcined in dry air for three hours at various temperatures to produce treated solid oxide compounds. These treated solid oxide compound samples were then tested for polymerization activity with an organometal compound and 1 millimole of TEA. Nearly all produced polymer. Table 2 lists the various activities observed.

Inventive Example 10 (Treated Solid Oxide Compound)

Grade 952 silica obtained from W.R. Grace was calcined in dry air at 600° C. for three hours to produce a calcined silica. Then, 7.2 grams of the calcined silica were slurried with an ethyl ether solution containing 7.2 millimoles of anhydrous fluoroboric acid (HBF4) to produce a treated solid oxide compound. The ether was removed by blowing dry nitrogen over the slurry, and finally, the treated solid oxide compound was warmed under flowing nitrogen to about 60° C. A 0.3283 gram sample of the treated solid oxide compound was charged to the reactor with TEA and an organometal compound. After about 66.4 minutes, the treated solid oxide compound produced 54 grams of polymer, giving an activity of 150 grams of polymer per gram of treated solid oxide compound per hour (g/g/h).

The remainder of the treated solid oxide compound was then charged to the quartz tube for calcining and warmed under dry nitrogen to 250° C. where it was held for 3 hours. A 0.0291 gram sample was charged to the reactor with TEA and an organometal compound. After about 69.0 minutes, it produced 37 grams of polymer, giving an activity of 350 grams of polymer per gram of treated solid oxide compound per hour.

TABLE 1

| Example | Test Compound* | Calcinating Temp. (° C.) | Test Compound (grams) | Polymer (grams) | Run Time (minutes) | Activity* (g/g/h) |
|---|---|---|---|---|---|---|
| 1 Control | None | | 0.0000 | 0 | 61.1 | 0 |
| 2 Control | Silica | 600 | 0.5686 | 0.65 | 63.0 | 1 |
| 3 Control | Fluorided Silica | 450 | 0.4350 | 0 | 24.5 | 0 |
| 4 Control | Silica-Boria | 400 | 0.5236 | 4.7 | 45 | 12 |
| 5 Inventive | Treated solid oxide compound | 300 | 0.0552 | 22 | 48.2 | 496 |
| 6 Inventive | Treated solid oxide compound | 400 | 0.1642 | 44 | 52.7 | 305 |
| 7 Inventive | Treated solid oxide compound | 500 | 0.1027 | 12 | 43.6 | 161 |
| 8 Inventive | Treated solid oxide compound | 250 | 0.4207 | 247 | 64.8 | 544 |
| 10 Inventive | Treated solid oxide compound | 600 | 0.3283 | 54 | 66.4 | 150 |

*Test Compound = oxide compound or inventive treated solid oxide compound
*Activity is in units of grams of polymer per gram of oxide compound or treated solid oxide compound per hour.

TABLE 2

(Example 9)

| Amount of $NH_4BF_4$ (mmol/g*) | Calcining Temp. (° C.) | Silica (grams) | Polymer (grams) | Run Time (minutes) | Activity* (g/g/h) |
|---|---|---|---|---|---|
| 0.3 | 400 | 0.1088 | 5.2 | 30.0 | 96 |
| 0.3 | 550 | 0.1133 | 40.0 | 30.0 | 706 |
| 0.3 | 700 | 0.1272 | 1.2 | 30.0 | 19 |
| 0.5 | 200 | 0.0850 | 31.0 | 30.0 | 729 |
| 0.5 | 300 | 0.1100 | 37.0 | 30.0 | 673 |
| 0.5 | 400 | 0.1071 | 50.0 | 30.0 | 934 |
| 0.5 | 500 | 0.1196 | 82.0 | 36.0 | 1143 |
| 0.5 | 600 | 0.1039 | 12.1 | 30.0 | 233 |
| 0.5 | 700 | 0.1220 | 2.3 | 30.0 | 38 |
| 1.0 | 550 | 0.1667 | 126.0 | 61.9 | 733 |
| 1.0 | 450 | 0.0803 | 60.0 | 61.8 | 725 |
| 1.0 | 300 | 0.1230 | 39.0 | 18.0 | 1057 |
| 3.0 | 280 | 0.0753 | 44.0 | 61.8 | 567 |
| 3.0 | 350 | 0.0523 | 14.0 | 58.5 | 275 |
| 3.0 | 450 | 0.0623 | 14.0 | 71.9 | 188 |
| 3.0 | 550 | 0.0542 | 0.0 | 28.0 | 0 |

*Amount of $NH_4BF_4$ - millimoles of $NH_4BF_4$/gram of silica.
*Activity - grams of polymer per gram of treated solid oxide compound per hour While this invention has been described in detail for the purpose of illustration, it is not intended to be limited thereby but is intended to cover all changes and modifications within the spirit and scope thereof That which is claimed is:

1. A process to produce a catalyst composition, said process comprising contacting an organometal compound, an organoaluminum compound, and a treated solid oxide compound to produce a catalyst composition substantially free of aluminoxane compounds and fluoro organic borate compounds, wherein said organometal compound has the following general formula:

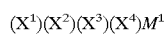

wherein $M^1$ is selected from the group consisting of titanium, zirconium, and hafnium;
wherein $(X^1)$ is independently selected from the group consisting of cyclopentadienyls, indenyls, fluorenyls, substituted cyclopentadienyls, substituted indenyls, and substituted fluorenyls;
wherein said substituents, on said substituted cyclopentadienyls, substituted indenyls, and substituted fluorenyls of $(X^1)$, are selected from the group consisting of aliphatic groups, cyclic groups, combinations of aliphatic and cyclic groups, silyl groups, haloalkyl groups, halides, hydrogen, phosphorus groups, nitrogen groups, and organometallic groups selected from the group consisting of substituted silyl derivatives, substituted tin groups, substituted germanium groups, and substituted boron groups;
wherein at least one substituent on $(X^1)$ can be a bridging group which connects $(X^1)$ and $(X^2)$;
wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;
wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;
wherein substituents on $(X^2)$ are selected from the group consisting of aliphatic groups, cyclic groups, combinations of aliphatic and cyclic groups, silyl groups, haloalkyl groups, halides, hydrogen, phosphorus groups, nitrogen groups, and organometallic groups selected from the group consisting of substituted silyl derivatives, substituted tin groups, substituted germanium groups, and substituted boron groups;

wherein at least one substitutent on $(X^2)$ can be a bridging group which connects $(X^1)$ and $(X^2)$;

wherein said organoaluminum compound has the general formula:

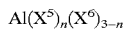

$$Al(X^5)_n(X^6)_{3-n}$$

wherein $(X^5)$ is a hydrocarbyl having from 1 to about 20 carbon atoms;

wherein $(X^6)$ is a halide, hydride, or alkoxide; and wherein "n" is a number from 1 to 3 inclusive;

wherein said treated solid oxide compound comprises fluorine, boron, and a solid oxide compound;

wherein said solid oxide compound comprises silica.

2. A process to produce a catalyst composition comprising:

1) contacting silica with an aqueous solution containing ammonium fluoroborate or fluoroboric acid to produce a fluorided, boron-containing solid oxide compound having from 1 to 3 millimoles of boron per gram of fluorided, boron-containing solid oxide compound before calcining and having from 4 to 25% by weight fluorine based on the weight of said fluorided, boron-containing sold oxide compound before calcining;

2) calcining said fluorided, boron-containing solid oxide compound at a temperature within a range of 250 to 500° C. for 3 to 20 hours to produce a calcined composition;

3) combining said calcined composition and bis(n-butylcyclopentadienyl)zirconium dichloride at a temperature within a range of 15° C. to 50° C. for 1 minute to 1 hour to produce a mixture; and 4) combining said mixture and triethylaluminum to produce said catalyst composition, wherein said catalyst composition is substantially free of aluminoxane compounds and fluoro organic borate compounds.

3. A process according to claim 2 wherein said process consists essentially of steps (1), (2), (3), and (4).

4. A catalyst composition produced by said process of claim 1.

5. A catalyst composition according to claim 4 wherein said catalyst composition has an activity greater than 500 grams of polymer per gram of treated solid oxide compound per hour under slurry polymerization conditions, using isobutane as a diluent, with a polymerization temperature of 90° C., and a pressure of 550 psig.

6. A process according to claim 5 wherein said catalyst composition has an activity greater than 1000 grams of polymer per gram of treated solid oxide compound per hour under slurry polymerization conditions, using isobutane as a diluent, with a polymerization temperature of 90° C., and a pressure of 550 psig.

7. A catalyst composition according to claim 5 wherein the weight ratio of said organoaluminum compound to said treated solid oxide compound in said catalyst composition ranges from about 3:1 to about 1:100.

8. A catalyst composition according to claim 7 wherein said weight ratio of said organoaluminum compound to said treated solid oxide compound in said catalyst composition ranges from 1:1 to 1:50.

9. A catalyst composition according to claim 5 wherein the weight ratio of said treated solid oxide compound to said organometal compound in said catalyst composition ranges from about 1000:1 to about 10:1.

10. A catalyst composition according to claim 9 wherein said weight ratio of said treated solid oxide compound to said organometal compound in said catalyst composition ranges from 250:1 to 20:1.

11. A catalyst composition according to claim 10 wherein said treated solid oxide compound comprises silica, 1 to 3 millimoles of boron per gram of treated solid oxide compound before calcining, from 4 to 25% by weight fluoride based on the weight of said treated solid oxide compound before calcining, and is calcined for 3 to 20 hours at a temperature from 250 to 500° C.

12. A polymerization process comprising contacting at least one monomer and said catalyst composition of claim 4 under polymerization conditions to produce a polymer.

13. A process according to claim 2 wherein at least one monomer comprises ethylene and an aliphatic 1-olefin having 3 to 20 carbon atoms per molecule.

14. A process according to claim 2 wherein said polymerization conditions comprise slurry polymerization conditions.

15. A process according to claim 14 wherein said contacting is conducted in a loop reaction zone.

16. A process according to claim 15 wherein said contacting is conducted in the presence of a diluent that comprises isobutane.

17. A process according to claim 2 wherein at least one monomer is ethylene.

* * * * *